United States Patent
Tsai

(10) Patent No.: US 8,279,196 B2
(45) Date of Patent: Oct. 2, 2012

(54) POWER-DOWN DISPLAY DEVICE USING A SURFACE CAPACITIVE TOUCH PANEL AND RELATED METHOD

(75) Inventor: Mi-lai Tsai, Keelung (TW)

(73) Assignee: Genesys Logic, Inc., Shindian, Taipei (TW)

( * ) Notice: Subject to any disclaimer, the term of this patent is extended or adjusted under 35 U.S.C. 154(b) by 516 days.

(21) Appl. No.: 12/490,983

(22) Filed: Jun. 24, 2009

(65) Prior Publication Data

US 2010/0214254 A1    Aug. 26, 2010

(30) Foreign Application Priority Data

Feb. 26, 2009   (TW) .............................. 98106258 A

(51) Int. Cl.
| | |
|---|---|
| G06F 3/045 | (2006.01) |
| G06F 3/041 | (2006.01) |
| G09G 5/00 | (2006.01) |
| G06F 1/04 | (2006.01) |
| H03K 3/00 | (2006.01) |

(52) U.S. Cl. ......... 345/174; 345/173; 345/156; 327/291
(58) Field of Classification Search .................. 713/300; 345/173
See application file for complete search history.

(56) References Cited

U.S. PATENT DOCUMENTS

| | | | | |
|---|---|---|---|---|
| 4,388,653 A | * | 6/1983 | Yamada | 358/302 |
| 5,949,262 A | * | 9/1999 | Dreps et al. | 327/156 |
| 6,388,183 B1 | * | 5/2002 | Leh | 84/645 |
| 2005/0168438 A1 | * | 8/2005 | Casebolt et al. | 345/156 |
| 2006/0284857 A1 | * | 12/2006 | Oh | 345/173 |
| 2008/0174354 A1 | * | 7/2008 | Yu et al. | 327/298 |
| 2009/0289908 A1 | * | 11/2009 | Chen et al. | 345/173 |
| 2010/0033437 A1 | * | 2/2010 | Matsubara | 345/173 |

* cited by examiner

*Primary Examiner* — Bipin Shalwala
*Assistant Examiner* — Ryan A Lubit

(57) ABSTRACT

A display device using a surface capacitive touch panel is proposed. Upon a normal mode, an external clock generator supports a clock source; meanwhile, an external clock generator, a signal generator, a current detector, a current-to-voltage converter, an analog-to-digital converter, a filter, an interface controller, a microprocessor, and the touch-position calculators are turned on. But under a power-down mode, the external clock generator, the analog-to-digital converter, filter, the interface controller, the microprocessor, and the touch-position calculators are turned off in order to reduce power consumption. Furthermore, the external clock generator is also turned off to minimize the power consumption.

22 Claims, 4 Drawing Sheets

POWER-DOWN DISPLAY DEVICE USING A SURFACE CAPACITIVE TOUCH PANEL AND RELATED METHOD

BACKGROUND OF THE INVENTION

1. Priority Claim

This application claims priority to Taiwanese Patent Application No. 098106258 filed on Feb. 26, 2009.

2. Field of the Invention

The present invention relates to a display device using a surface capacitive touch panel and its related method, more particularly, to a power-down display device using a surface capacitive touch panel device and its drive method.

3. Description of Prior Art

With a rapid development of monitor types, novel and colorful monitors with high resolution, e.g., liquid crystal displays (LCDs), are indispensable components used in various electronic products such as monitors for notebook computers, personal digital assistants (PDAs), digital cameras, and projectors. The demand for the novelty and colorful monitors has increased tremendously.

Nowadays, in order to carry and use liquid crystal displays more easily, developing a touch liquid crystal panel that users can touch directly also becomes one of the tendencies of market development. Conventional optical touch panels set up a quantity of light and its corresponding optical sensing elements around the liquid crystal panel, utilizing the optical sensing elements to detect the light corresponded to its optical source to judge position coordinates of points of contact pressure. Such a design will increase the volume of the products by a large margin, so this design does not meet the requirements of general portable liquid crystal displays. Another kind of touch panel device is a surface resistance touch display panel or a surface capacitive touch display panel, which is placed additionally on display panels, such as LCD panels and CRT displays, and is judged its position coordinates by detecting variations of voltage values of points of contact pressure. However, because a touch panel is directly placed on a display panel, the rate of penetration of light will decline.

Referring to FIG. 1 showing a block diagram of a conventional display device 10 using a surface capacitive touch panel, the display device 10 comprises a clock generator 1, a surface capacitive touch panel 6, and a touch panel controller 8. The touch panel controller 8 integrates and comprises a phase lack loop (PLL) 2, a control logic 7, a signal generator 4, and a current detector 5. The clock generator 1 can be a crystal oscillator. The clock generator 1 is used as an external clock generator to generate clock signals to other circuits. When the surface capacitive touch panel 6 is enabled, the signal generator 4 will generate sensing signals to detect whether a user's fingers touch the surface capacitive touch panel 6 or not. Meanwhile, the current detector 5 will detect currents in response to a contact of the user's fingers on the surface capacitive touch panel 6. The control logic 7, comprising the interface controller 3, can determine the fingers' touch positions on the surface capacitive touch panel 6 according to the sensing current detected by the current detector 5, and then transmit the touch positions to the host for the use of the system. Once the display device 10 is enabled, the circuits of the display device 10 will always remain functioning in order to detect all the time whether a user's fingers touch the surface capacitive touch panel 6 or not. Practically, however, the surface capacitive touch panel 6 is not always enabled. For most of time, it will squander power additionally to keep all of the circuits functioning. Based upon the consideration above, developers make every effort to manufacture a power-down surface capacitive touch panel to correspond with the more eco-friendly era.

SUMMARY OF THE INVENTION

Briefly summarized, a power-down display device comprises a surface capacitive touch panel for inputting a contact of an object; a first clock generator for generating a first clock signal; a second clock signal generator for generating a second clock signal; a multiplexer coupled to the first clock signal and the second clock signal; a signal generator coupled to the surface capacitive touch panel, for generating a sensing signal when the object contacts the surface capacitive touch panel; a current detector coupled to the surface capacitive touch panel, for generating a sensing current when the object contacts the surface capacitive touch panel; a current-voltage converter for converting the sensing current to a sensing voltage; an analog-to-digital converter for converting the sensing voltage to digital data signal; and a touch-position calculator for calculating a touch position on the surface capacitive touch panel based on digital data signal. When the display device operates in a normal mode, the multiplexer switches to the first clock generator to output the first clock signal, or when the display device operates in a power-down mode, the multiplexer switches to the second clock generator to output the second clock signal.

According to the present invention, a method of reducing power consumption of a display device is proposed. The display device comprises a surface capacitive touch panel, a first clock generator, a signal generator, a current detector, a current-voltage converter, an analog-to-digital converter, a control logic, a filter and a touch-position calculator. The method comprises the steps of:

(a) providing a second clock generator and a timer;

(b) enabling the first clock generator, the signal generator, the current detector, the current-voltage converter, the analog-to-digital converter, the filter, and the touch-position calculator, when the display device operates in a normal mode;

(c) when a time period of the surface capacitive touch panel not touched by an object matches a predetermined time period, setting the display device to operate in a power-down mode to turn off the analog-to-digital converter, the filter, and the touch-position calculator, and to enable the second clock generator and the timer; and (d) timing with the timer a pause time and a short active time of the power-down mode, wherein the short active time is a time interval to detect whether the surface capacitive touch panel is touched by an object, the signal generator, the current detector, the current-voltage converter, and the control logic enable during the short active time, and the signal generator, the current detector, the analog-to-digital converter, the filter, the touch-position calculator, the interface controller, and the microprocessor turns off while the second clock generator and the timer enable during the pause time.

According to the present invention, the display device detects the time at which the surface capacitive touch panel is touched by an object when the display device enters the normal mode after being turned on. If the surface capacitive touch panel is not touched in one predetermined time, it will enter an power-down mode and switch clock source from an energy-consuming exterior first clock generator and a phase-locked loop to a more power-down interior second clock generator. Once the power-down mode's pause time starts, except for the operations of the second clock generator and the timer, the other circuits of the touch panel controller will be turned off to save energy. When the first set time period of the pause time passes, the display device will enter a short active time. At this time, the signal generator, the current sensor, the current voltage converter, and the control logic will be turned on as well to detect periodically if the surface capacitive touch panel is touched by an object. Not until the surface capacitive touch panel is touched by an object, will the display device supply again the clock signals to all of the circuits of the touch panel controller through the first clock generator and phase-locked loop. So, in the power-down mode, the present invention can utilize the more power-down interior second clock generator to provide the clock signals to parts of the circuits operated in the touch panel controller. In this way, this invention can effectively lessen the loss of power to achieve the goal of power-down.

These and other objectives of the present invention will become apparent to those of ordinary skill in the art after reading the following detailed description of the preferred embodiment that is illustrated in the various figures and drawings.

DETAILED DESCRIPTION OF THE PREFERRED EMBODIMENTS

Figure 1:
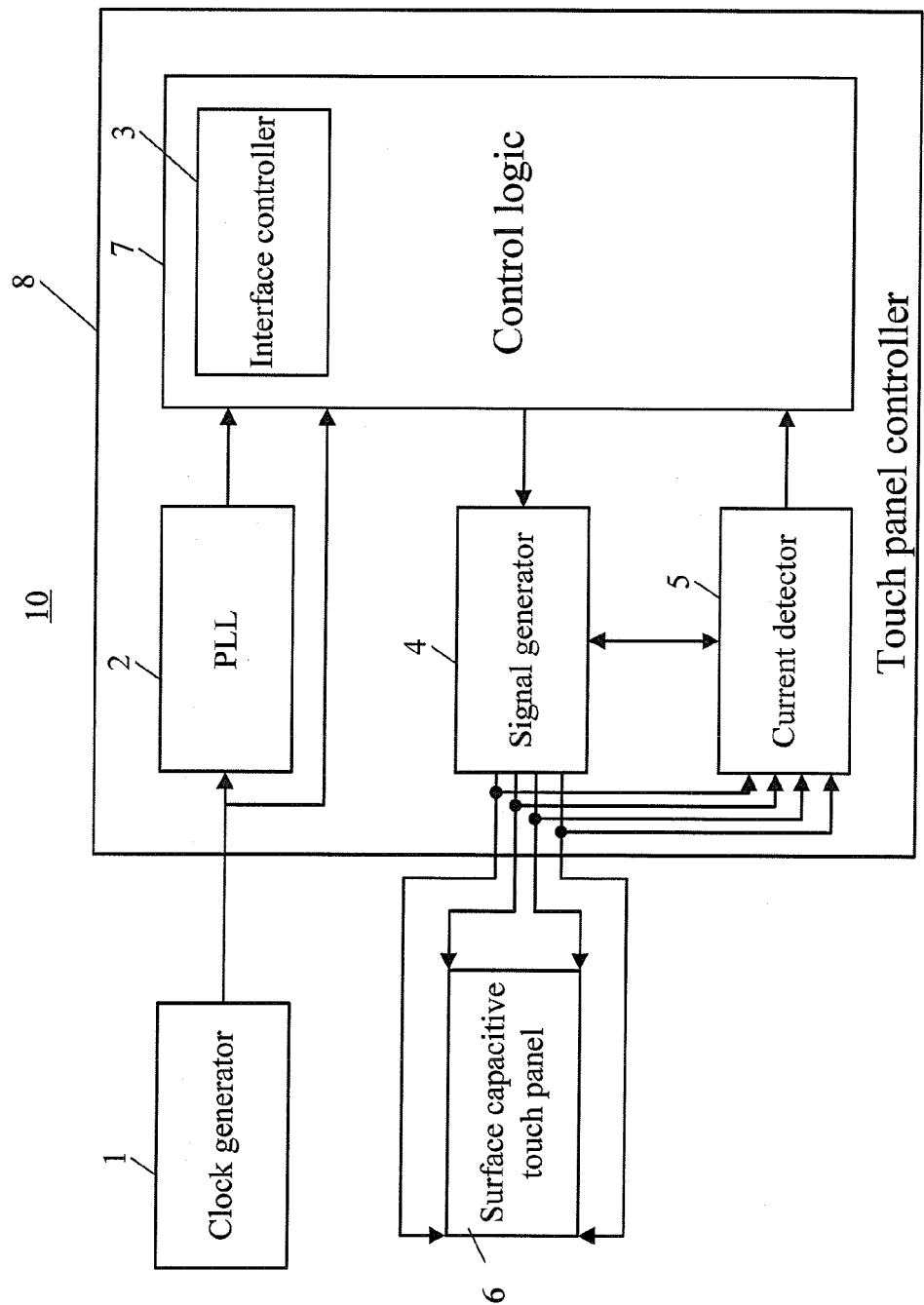
FIG. 1 shows a block diagram of a conventional display device using a surface capacitive touch panel.
Figure 2:
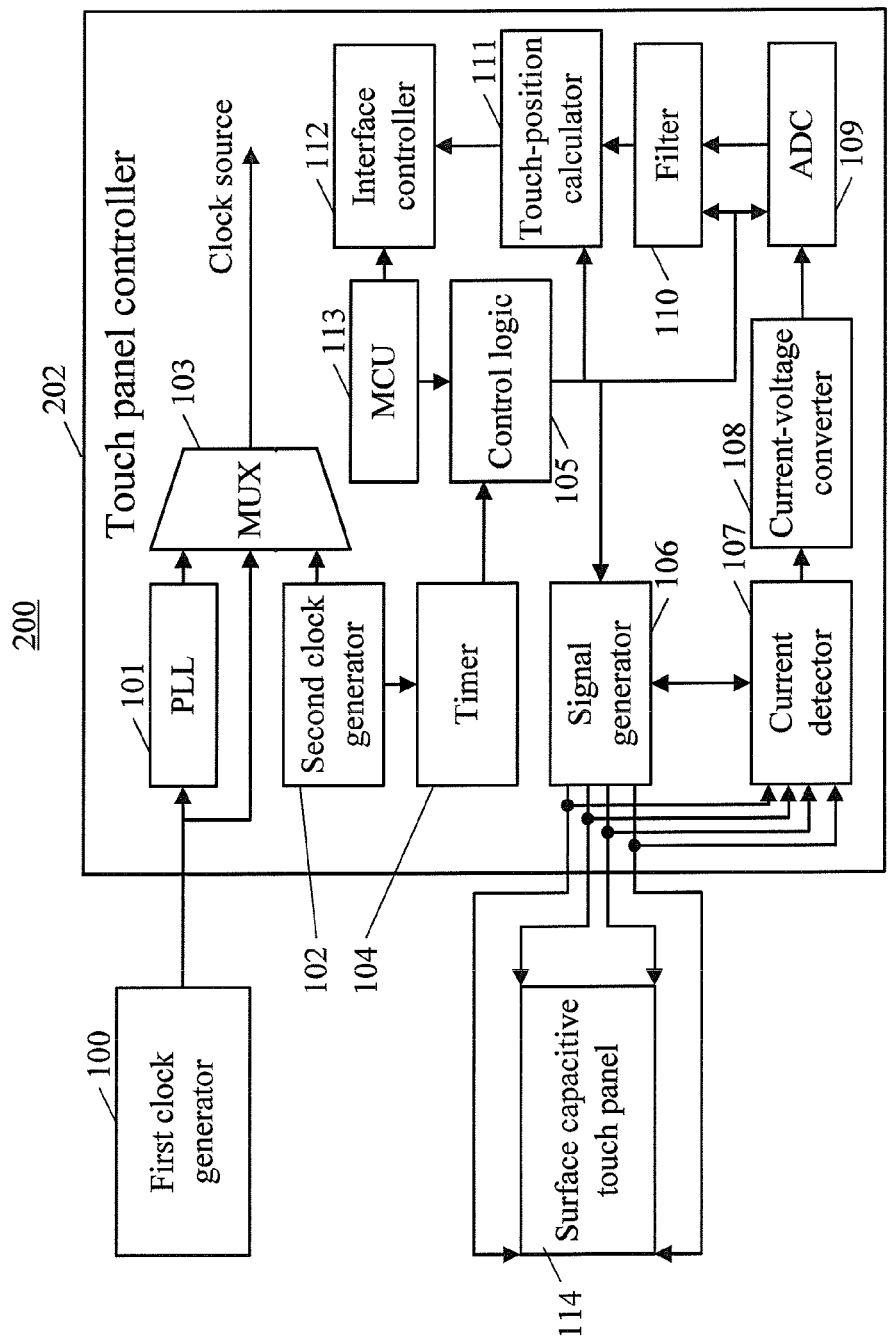
FIG. 2 shows a block diagram of a display device using a surface capacitive touch panel according to a preferred embodiment of the present invention.

Referring to FIG. 2 showing a block diagram of a display device 200 using a surface capacitive touch panel according to a preferred embodiment of the present invention, the display device 200 comprises a first clock generator 100, a touch panel controller 202, and a surface capacitive touch panel 114. The touch panel controller 202 integrates and comprises a phase lack loop (PLL) 101, a second clock generator 102, a multiplexer (MUX) 103, a timer 104, a control logic 105, a signal generator 106, a current detector 107, a current-voltage converter 108, an analog-to-digital converter (ADC) 109, a filter 110, a touch-position calculator 111, an interface controller 2, and a microprocessor 3. The first clock generator 100, which can be a crystal oscillator, is used as an exterior clock generator to generate first clock signals to the other circuits. The display device 200 sometimes functions in higher frequency. At this time, the display device 200 needs the phase lack loop 101 to be multiplied in frequency. If the display device 200 does not function in a higher frequency, the PLL 101 is turned off; instead, the first clock generator 100 directly provides clock signals to the other circuits. The second clock generator 102 is used to provide second clock signals to parts of the circuits inside the touch panel controller 202 when the display device 200 is in the power-down mode. When the user contacts the surface capacitive touch panel 114 with their fingers, the touch panel controller 202 calculates touch positions and then outputs the touch positions to the display device 200. The methods of the operation of each of the circuits inside the touch panel controller 202 will be introduced in detail as follows.

Figure 3:
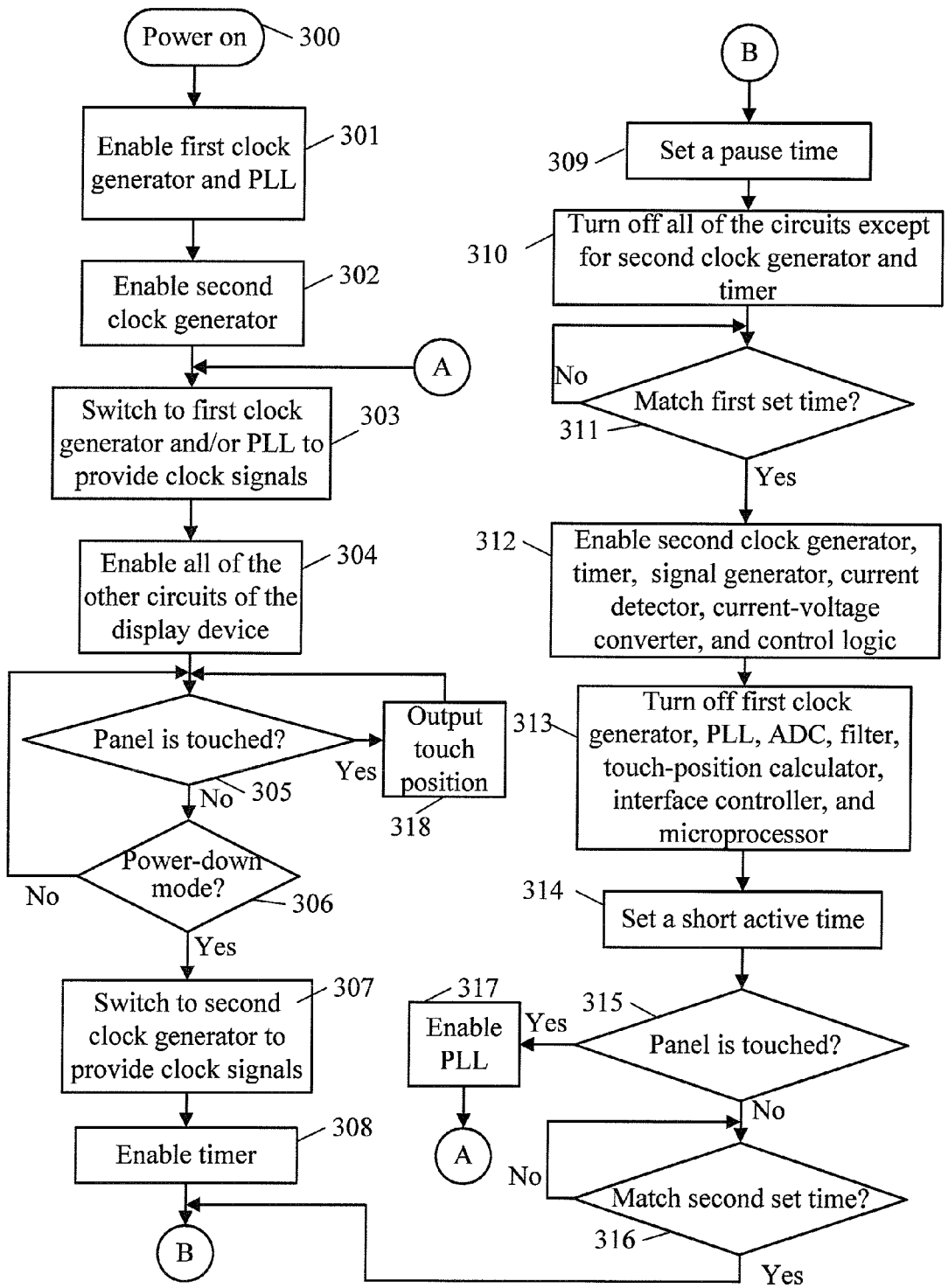
FIG. 3 illustrates the flowchart of operation of the display device.

Referring to FIG. 2 and FIG. 3, FIG. 3 illustrates the flowchart of operation of the display device 200. FIG. 3 comprises the following steps.

Step 300: Power on the display device 200.
Step 301: Enable the first clock generator 100 and the phase lack loop 101.
Step 302: Enable the second clock generator 102.
Step 303: Switch to the first clock generator 100 and/or the phase lack loop 101 to provide the clock signals.
Step 304: Enable all of the other circuits of the display device 200.
Step 305: Detect if an object touches the panel 114. If so, perform Step 318; if not, perform Step 306.
Step 306: Does it correspond with the qualification of the power-down mode? If so, perform Step 307; if not, perform Step 305.
Step 307: Switch to the second clock generator 102 to provide the second clock signals.
Step 308: Enable the timer 104.
Step 309: Set a pause time.
Step 310: Turn off all of the circuits except for the second clock generator 102 and the timer 104.
Step 311: Does it correspond with the first set time in the pause time? If so, perform Step 312; if not, perform Step 311.
Step 312: Enable the second clock generator 102, the timer 104, the signal generator 106, the current detector 107, the current-voltage converter 108, and the control logic 105.
Step 313: Turn off the first clock generator 100, the phase lack loop (PLL) 101, the analog-to-digital converter 109, the filter 110, the touch-position calculator 111, the interface controller 112, and the microprocessor 113.
Step 314: Set a short active time.
Step 315: Does any object touch the panel 114? If so, perform Step 317; if not, perform Step 316.
Step 316: Does it correspond with the second set time in the short active time? If so, perform Step 309; if not, perform Step 316.
Step 317: Enable the phase lack loop (PLL) 101 and then perform Step 303.
Step 318: Output the touched positions to a host and then perform Step 305.

When powered on (Step 300), the display device 200 enables the first clock generator 100 and the phase lack loop (PLL) 101, and then the second clock generator 102 (Step 302). At this time, the first clock generator and/or the phase lack loop (PLL) 101 will replace the multiplexer (MUX) 103 to become a main clock signal source (Step 303) to provide the first clock signals to the touch panel controller 202 to make all of the circuits function well. At this stage, the display device 200 is in the normal mode (that is, in the first mode). In some of the embodiments, the second clock generator 102 in the normal mode will have to be moderately calibrated via the microprocessor 113 to obtain more precise clock frequencies. The calibrated second clock generator 102 is used as a clock to provide a power-down mode in the following operation. In the normal mode, all of the circuits of the touch panel controller 202 will be enabled (Step 304). In Step 305, the display device 200 will start to detect whether an object, such as a user's fingers, touches the surface capacitive touch panel 114 or not. The signal generator 106 will provide sensing signals from the four corners of the surface capacitive touch panel 114. Once the object, such as a user's fingers, touches the surface capacitive touch panel 114, the current detector 107 will detect various sensing current flowing through the four corners of the surface capacitive touch panel 114 in response to the positions where the fingers touch the surface capacitive touch panel 114. The current-voltage converter 108 is used to convert the sensing current flows into sensing voltages. After the analog-to-digital converter 109 converts the sensing voltages into digital data, the filter 110 will filter and demodulate the digital data and transmit it to the touch-position calculator 111. The touch-position calculator 111 is used to calculate the touch-position that the object touches the surface capacitive touch panel 114 according to the digital data. Finally, the interface controller 112 transmits the calculated touch-positions to the host for usage (Step 318). Generally speaking, the interface controller 112 adopts universal serial bus (USB), RS232, or SPI protocol. At this time, the microprocessor 113 is used to control the operation of the display device 200, and the control logic 105 generates control signals to control the signal generator 106, the analog-to-digital converter 109, the filter 110, and the touch-position calculator 111 under the control of the microprocessor 113 or the timer 104.

It is noted that, in the normal mode, all of the circuits operate according to the first clock signals from the first clock generator 100 and the phase lack loop (PLL) 101, so the power consumption of the display device 200 reaches to the peak at this time. In some of the embodiments, it is not necessary to provide higher clock frequencies to the surface capacitive touch panel device, so the phase lack loop (PLL) 101 is not required.

Figure 4:
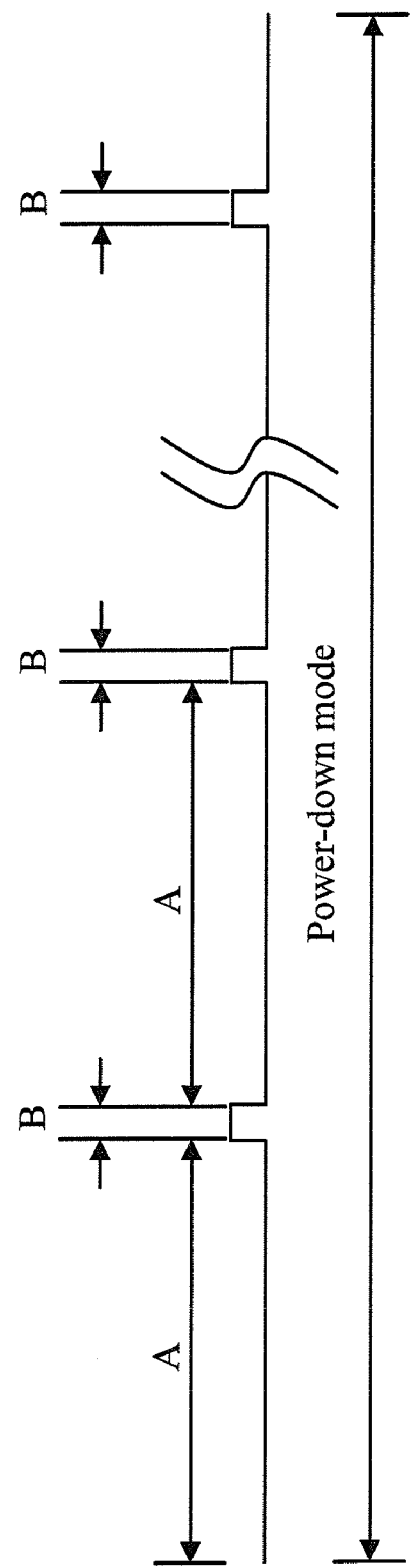
FIG. 4 is a timing diagram of demonstrating that the display device enters a power-down mode.

Referring to FIG. 4, FIG. 4 is a timing diagram of demonstrating that the display device 200 enters a power-down mode. When the surface capacitive touch panel 114 is not touched by a user's fingers in a predetermined time (e.g. 15 minutes), the display device 200 enters the power-down mode. At this time, the multiplexer (MUX) 103 will switch to the second clock generator 102 as a clock source (Step 307) and enable the timer 104 (Step 308). The power-down mode has two types, a pause time and a short active time. Upon the power-down mode at the beginning, the display device 200 enters the pause time at first (Step 309). At this time, in order to save energy, all of the circuits will be turned off except for the second clock generator 102 and the timer 104 (Step 310). During the pause time, once a first set time period A (e.g. 350 ms) is matched, the second clock generator 102, the timer 104, the signal generator 106, the current detector 107, the current-voltage converter 108, and the control logic 105 will be enabled, as illustrated in Step 312. At this time, the first clock generator 100, the phase lack loop (PLL) 101, analog-to-digital converter 109, the filter 110, the touch-position calculator 111, the interface controller 112, and the microprocessor 113 will remain turned off (Step 313).

In the following, the display device 200 enters the short active time of the power-down mode, as illustrated in Step 314. Preferably, an interval of a second set time period B of the short active time is shorter than that of the first set time period A of the power-down mode. In the short active time, the timer 104 periodically detects if the surface capacitive touch panel 114 is touched by an object. At this time, because the signal generator 106, the current detector 107, the current-voltage converter 108, and the control logic 105 are still functioning, so that the signal generator 106 continues generating sensing signals, and then the current detector 107 continues detecting the sensing current flow. As long as the sensing current flow reaches the predetermined value, indicating that the surface capacitive touch panel 114 is touched by an object. At this time, the display device 200 will be woken up to enable the first clock generator 100 and the phase lack loop (PLL) 101 (Step 307). The first clock generator 100 and the phase lack loop (PLL) 101, replacing the multiplexer 103 again, provides all of the circuits of the touch panel controller 202 with clock signals. Afterwards, the display device 200 will soon recover to the normal mode and then all of the circuits of the touch panel controller 202 will be enabled to function again. If the second set time period B of the short active time is arrived while the current detector 107 does not detect the sensing current flow reaching the predetermined value, indicating that the surface capacitive touch panel 114 is not touched by an object. And then, the display device 200 will enter the pause time again.

In summary, in accordance with the present invention, once entering the normal mode after being powered on, the display device 200 will detect if the surface capacitive touch panel 114 is touched by an object and the detect time. If the surface capacitive touch panel 114 is not touched within one predetermined time, it will enter the power-down mode and switch from the external clock source, i.e. the power-consuming first clock generator 100 and the phase lack loop 101, to the internal clock source which is the more power-down second clock generator 102. Meanwhile, the surface capacitive touch panel 114 will turn off the first clock generator 100 and the phase lack loop 101. Once the pause time of the power-down mode begins, except for the second clock generator 102 and the timer 104, the other circuits of the touch panel controller 202 will be turned off to save energy. After the first set time period of the pause time passes, the surface capacitive touch panel 114 will enter the short active time. At this time, the signal generator 106, the current detector 107, the current-voltage converter 108, and the control logic 105 will be turned on to detect periodically whether the surface capacitive touch panel 114 is touched by an object or not. Not until the surface capacitive touch panel 114 is touched by an object, will the first clock generator 100 and the phase lack loop (PLL) 101 provide again clock signals to all of the circuits of the touch panel controller 202 in the display device 200. Therefore, the present invention in the normal mode utilizes the more power-down internal second clock generator 102 to provide the clock signals to some of the circuits turned on in the touch panel controller 202. In this way, the power consumption can be effectively reduced to save energy. It is worthy of notifying that the touch panel used in the present invention is not confined to a surface capacitive touch panel but can cooperate with a surface resistance touch panel or other kinds of touch panels as well.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:
1. A power-down display device, comprising:
 a surface capacitive touch panel for inputting a contact of an object;
 a first clock generator for generating a first clock signal; and
 a touch panel controller comprising:
  a second clock signal generator for generating a second clock signal;
  a multiplexer coupled to the first clock signal and the second clock signal;
  a phase lock loop coupled to the multiplexer and the first clock generator, for multiplying the first clock signal in frequency when the display device operates in a normal mode;

a signal generator coupled to the surface capacitive touch panel, for generating a sensing signal when the object contacts the surface capacitive touch panel;

a current detector coupled to the surface capacitive touch panel, for generating a sensing current when the object contacts the surface capacitive touch panel;

a current-voltage converter for converting the sensing current to a sensing voltage;

an analog-to-digital converter for converting the sensing voltage to a digital data signal; and a touch-position calculator for calculating a touch position on the surface capacitive touch panel based on the digital data signal, wherein when the display device operates in the normal mode, the multiplexer switches to the first clock generator and the phase lock loop to output the first clock signal, and when the display device operates in a power-down mode, the multiplexer switches to the second clock generator to output the second clock signal, and the phase lock loop, the first clock generator, the analog-to-digital converter, and the touch-position calculator are turned off.

2. The display device of claim 1, wherein the display device operates in the normal mode, the first clock generator, the second clock generator, the multiplexer, the signal generator, the current detector, the current-voltage converter, the analog-to-digital converter, and the touch-position calculator are turned on.

3. The display device of claim 1, wherein the power-down mode further comprises a pause time and a short active time.

4. The display device of claim 3, further comprising:
a timer coupled to the second clock signal, for timing the object not touch the surface capacitive touch panel until a first set time period of the pause time is matched or until a second set time period of the short time is match, when the display device operates in the power-down mode.

5. The display device of claim 4, further comprising:
a microprocessor for controlling operations of the display device; and
a control logic coupled to the microprocessor, for managing the timer under the control of the microprocessor.

6. The display device of claim 5, wherein the signal generator, the current detector, the current-voltage converter, and the control logic are enabled during the short active time.

7. The display device of claim 1, further comprising a filter coupled to the analog-to-digital converter, for enabling to filter and demodulate the digital data signal, when the display device operates in the normal mode.

8. The display device of claim 1, further comprising an interface controller for delivering the touch position to a host when the display device operates in the normal mode.

9. The display device of claim 8, wherein the interface controller adopts a Universal serial bus (USB), RS232 or SPI protocol to transmit data.

10. A method of reducing power consumption of a display device, the display device comprising a surface capacitive touch panel, a first clock generator, and a touch panel controller, the touch panel controller comprising a signal generator, a current detector, a phase lock loop, a current-voltage converter, an analog-to-digital converter, a control logic, a filter and a touch-position calculator, the method comprising:

(a) providing a second clock generator and a timer, both of which are disposed within the touch panel controller;

(b) enabling the first clock generator, the signal generator, the current detector, the current-voltage converter, the phase lock loop, the analog-to-digital converter, the filter, and the touch-position calculator, when the display device operates in a normal mode;

(c) when a time period of the surface capacitive touch panel not touched by an object matches a predetermined time period, setting the display device to operate in a power-down mode to turn off the analog-to-digital converter, the filter, the phase lock loop, and the touch-position calculator, and to enable the second clock generator and the timer; and (d) timing with the timer a pause time and a short active time of the power-down mode, wherein the short active time is a time interval to detect whether the surface capacitive touch panel is touched by an object, the signal generator, the current detector, the current-voltage converter, and the control logic enable during the short active time, and the signal generator, the current detector, the analog-to-digital converter, the filter, the touch-position calculator, the interface controller, and the microprocessor turns off while the second clock generator and the timer enable during the pause time.

11. The method of claim 10 further comprising:
(e) after step (d), enabling the signal generator, the current detector, and the control logic, when a time period of the surface capacitive touch panel not touched by an object matches a second set time period.

12. The method of claim 10 wherein the display device further comprises an interface controller, the step (b) further comprises: enabling the interface controller to transmit a touch position of the object on the surface capacitive touch panel to a host, when the display device operates in the normal mode.

13. A touch panel controller coupled to a touch panel to be inputted a contact of an object, comprising:
a first clock generator for generating a first clock signal;
a second clock signal generator for generating a second clock signal;
a multiplexer coupled to the first clock signal and the second clock signal;
a phase lock loop coupled to the multiplexer and the first clock generator, for multiplying the first clock signal in frequency when the display device operates in a normal mode;
a contact sensing/detecting module for detecting whether the object contacts the touch panel; and
a microprocessor for controlling an operation of the touch panel,
wherein when the display device operates in the normal mode, the multiplexer switches to the first clock generator and the phase lock loop to output the first clock signal, and when the display device operates in a power-down mode, the multiplexer switches to the second clock generator to output the second clock signal, and the phase lock loop, the analog-to-digital converter, and the touch-position calculator are turned off.

14. The touch panel controller of claim 13, wherein the contact sensing/detecting module comprises:
a signal generator coupled to the touch panel, for generating a sensing signal when the object contacts the surface capacitive touch panel;
a current detector coupled to the touch panel, for generating a sensing current when the object contacts the surface capacitive touch panel; and
a current-voltage converter for converting the sensing current to a sensing voltage.

15. The touch panel controller of claim 13, wherein the first clock generator is an oscillator.

16. The touch panel controller of claim 13, further comprising:
an analog-to-digital converter for converting the sensing voltage to digital data signal; and
a touch-position calculator for calculating a touch position on the surface capacitive touch panel based on digital data signal.

17. The touch panel controller of claim 13, wherein the display device operates in the normal mode, the first clock generator, the second clock generator, the multiplexer, the signal generator, the current detector, the current-voltage converter, the analog-to-digital converter, and the touch-position calculator are turned on.

18. The touch panel controller of claim 13, wherein the power-down mode further comprises a pause time and a short active time.

19. The touch panel controller of claim 18, further comprising:
a timer coupled to the second clock signal, for timing the object not touch the surface capacitive touch panel until a first set time period of the pause time is matched or until a second set time period of the short time is match, when the display device operates in the power-down mode.

20. The touch panel controller of claim 19, further comprising:
a control logic coupled to the microprocessor, for managing the timer under the control of the microprocessor.

21. The touch panel controller of claim 20, wherein the signal generator, the current detector, the current-voltage converter, and the control logic are enabled during the short active time.

22. The touch panel controller of claim 13, further comprising:
a filter coupled to the analog-to-digital converter, for enabling to filter and demodulate the digital data signal, when the display device operates in the normal mode; and
an interface controller for delivering the touch position to a host when the display device operates in the normal mode.

* * * * *